United States Patent
Bosse

[15] 3,668,046
[45] June 6, 1972

[54] APPARATUS FOR PERFORMING WELDING OR HOT GLUING OPERATIONS ON CONTINUOUSLY MOVED WEBS

[72] Inventor: Frank Bosse, Ibbenburen-Dorenthe, Germany

[73] Assignee: Windmoller & Holscher, Lengerich of Westphalia, Germany

[22] Filed: Apr. 22, 1970

[21] Appl. No.: 30,867

[30] Foreign Application Priority Data

May 14, 1969 Germany ..................... P 19 24 730.4

[52] U.S. Cl. .......................... 156/553, 226/114, 156/251, 156/515
[51] Int. Cl. .................................. B32b 31/20, B32b 31/08
[58] Field of Search .......... 156/515, 547, 251, 553, 580-583; 226/114

[56] References Cited

UNITED STATES PATENTS

| | | | |
|---|---|---|---|
| 3,148,598 | 9/1964 | Davis | 156/515 X |
| 1,954,349 | 4/1934 | Dewey et al. | 226/114 X |
| 2,021,560 | 11/1935 | Lira | 226/114 X |
| 2,649,867 | 8/1953 | Powell | 226/114 X |
| 1,411,789 | 4/1922 | Kellogg | 226/114 |
| 3,134,005 | 5/1964 | Mayhew | 156/515 X |
| 3,053,723 | 9/1962 | Plach et al. | 156/515 X |

Primary Examiner—Samuel Feinberg
Assistant Examiner—J. M. Hanley
Attorney—Fleit, Gipple & Jacobson

[57] ABSTRACT

In flat bag-making machines, a web which is thermoplastic or coated with a thermoplastic layer is withdrawn from a supply roll and continuously advanced, formed into a tubing in a tube-making device, whereafter the tubing is processed to form flat bags in that welded or hot glued seams are formed and the tubing is transversely cut. The apparatus comprises a carrier, which supports the web and on which the heated welding or hot gluing jaws are mounted to be reciprocable to and from the carrier, whereas the carrier itself is reciprocable relative to the web in the direction of travel thereof in such a manner that the movement of the carrier relative to the web is zero for a time which is sufficient for the welding or gluing operation. The carrier consists of a rocker, which is pivoted on an axis that is transverse to the direction of travel of the web and extends through the transverse center plane of the rocker, the latter is pivotally movable within a loop which is formed in the web by means of two stationary guide rollers, and the rocker is provided with drive means which impart to the rocker a rocking motion at a peripheral velocity which is temporarily equal to the velocity of travel of the web.

7 Claims, 3 Drawing Figures

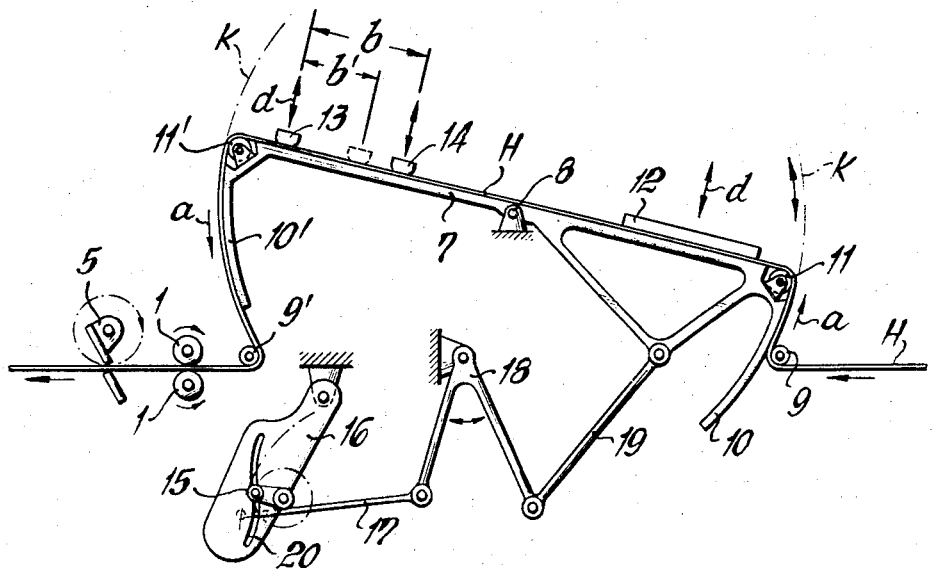
FIG.1
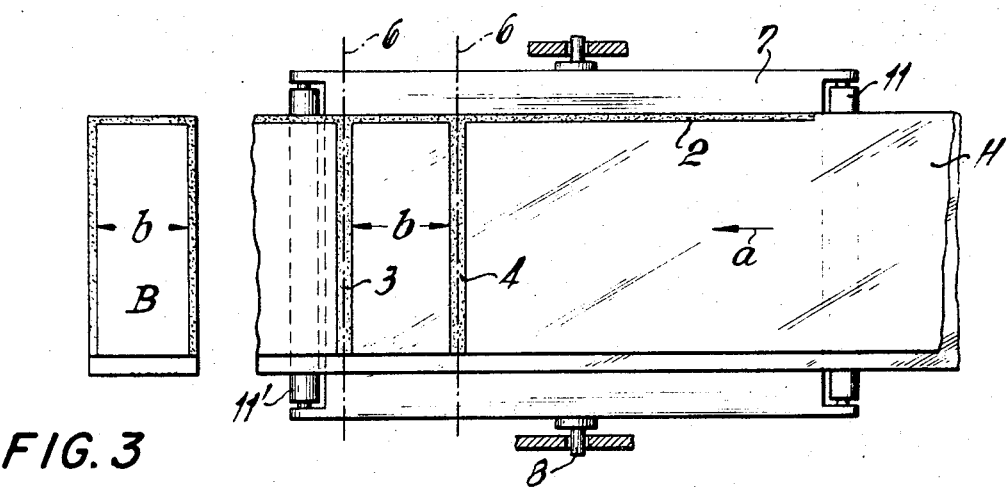
FIG.2
FIG.3
INVENTOR
Frank BOSSE
BY
Fleit, Gipple & Jacobson
his ATTORNEYS

APPARATUS FOR PERFORMING WELDING OR HOT GLUING OPERATIONS ON CONTINUOUSLY MOVED WEBS

BACKGROUND OF THE INVENTION

This invention relates to apparatus for performing welding or hot gluing operations on continuously advanced webs consisting of a suitable thermoplastic or heat-sealable material. Such apparatus is used, e.g., in flat bag-making machines, in which a web which is thermoplastic or coated a thermoplastic layer is withdrawn from a supply roll and continuously advanced, formed into a tubing in a tube-making device, whereafter the tubing is processed to form flat bags in that welded or hot glued seams are formed and the tubing is transversely cut.

To provide welded or hot glued joints of adequate strength, the welding or hot gluing operations require a certain time, in which heat can be transferred from the welding or hot gluing tool to the tubing. For this reason, it is not possible to use welding or hot gluing tools which revolve on a circular orbit at the speed of travel of the tubing because such tools would only instantaneously contact the tubing. The welding or hot gluing tools which are employed comprise a carrier, which supports the tubing or other web and on which the heated welding or hot gluing tools are mounted to be reciprocable to and from the tubing whereas the carrier itself is reciprocable in the direction of travel of the web and in step with the cycles of the flat bag-making machine in such a manner that the carrier is in synchronism with the tubing during each cycle for a time which is sufficient for the welding or hot gluing operation. The welding or hot gluing tools are applied during that period of synchronism. The stroke of the carrier corresponds only to the length by which the tubing is advanced by one or more bag widths or lengths, depending on the number of transverse heat sealing tools.

It is an object of the invention to provide for performing welding or hot gluing operations on continuously advanced webs an apparatus which does not give rise to free mass forces in operation so that there is no need to provide expensive means for a balancing of masses.

This object is accomplished according to the invention in that in an apparatus of the kind described first hereinbefore the carrier consists of a rocker, which is pivoted on an axis that is transverse to the direction of travel of the web and extends through the transverse center plane of the rocker, the latter is pivotally movable within a loop which is formed in the web by means of two stationary guide rollers and the rocker is provided with drive means which impart to the rocker a rocking motion at a peripheral velocity which is temporarily equal to the velocity of travel of the web. The peripheral velocity is the peripheral velocity of the free ends of the rocker; these free ends necessarily move on a circular orbit.

A standstill of the web relative to the rocker is required for the welding or hot gluing operations. This standstill will be obtained during the swing in the direction of travel, exactly during the time for which the ends of the rocker are in synchronism with the web. Because the pivotal axis of the rocker is disposed in the transverse center plane of the rocker so that the two arms of the rocker are of equal length, the rocking motion of the rocker will not change the overall length of the loop of the web so that the velocity of the web at the preceding and succeeding guide rollers will not be changed.

The rocker requires only a small space because it rocks on a stationary axis. It is structurally simple and light in weight. In a preferred embodiment of the invention the rocker is designed so that its center of gravity lies as closely as possible to the pivotal axis of the rocker. This arrangement will avoid an occurrence of free mass forces during the rocking motion of the rocker so that there is no need for means for balancing the masses of the rocker. As distinguished from the known carrier which reciprocates on a straight line, the rocking motion of the rocker requires only a fraction of the driving energy, e.g., one-third thereof, which would be required for a carrier having the same mass and moved over the same distance. Because balancing masses are generally required in the means for driving the carrier, the actual energy requirement of the rocker is in fact much smaller. Hence, the means for driving the rocker may be much lighter in weight than the means for driving the known carrier or the known looping carriage.

As a result of the above, the apparatus according to the invention does not contribute to a significant extent to the dimensions of the flat bag-making machine and to the costs of manufacturing the same. The apparatus enables a high output even in the manufacture of flat bags having large dimensions and has a much lower energy requirement than the known apparatus.

According to another feature of the invention, the rocker carries at both ends guide plates of metal, which serve to guide the web and have the shape of arcs of a circle having the same curvature as the circular orbit which is described by the ends of the rocker. This design of the rocker may be improved in accordance with the invention by the provision of rotatable guide rollers between the ends of the rocker and the guide plates. The latter design will avoid a severe action on the web adjacent to the rocker. The guide rollers may be arranged to guide the web so that it is close to but clear from the surface of the rocker.

A preferred means for driving the rocker consists according to the invention of a slider linkage, in which the rocker arm has a curved cam slot for the crank pin and said slot is so shaped that a connecting linkage which transmits the oscillation of the rocker arm to the rocker imparts to the ends of the rocker a rocking motion which is temporarily synchronized with the velocity of travel of the web. Such drive means have the advantage that the oscillating masses of the rocker arm and of the connecting linkage can be balanced to a large extent by a balancing mass carried by the driving crankshaft so that a smooth operation of the bag-making machine will be ensured even at a high output.

An embodiment of the invention is shown by way of example on the drawing, in which FIG. 1 is a diagrammatic elevation showing the welding or hot gluing apparatus for forming the required longitudinal and transverse heat-sealed seams in a machine for making flat bags, FIG. 2 is a top plan view showing the apparatus of FIG. 1 and FIG. 3 shows a bag which has been made in the flat bag-making machine by means of the apparatus shown in FIGS. 1 and 2.

The welding apparatus shown on the drawing is an essential part of a flat bag-making machine, which is known per se and not shown in detail. In that machine, the weldable web is uniformly advanced in the direction of travel $a$ by the pair of feed rolls 1, and during said advance is formed into a half tubing H, which in the welding apparatus is provided with the longitudinal and transverse seam welds 2, 3, 4 which are required to form the bags (FIG. 2). The individual bags B (FIG. 3) are then severed from the half tubing by a cross-cutting operation performed by a rotary cutting mechanism 5 of the bag-making machine, which produces cuts 6 extending through the centers of the transverse seam welds 3, 4. These cuts are indicated in dash-dot lines in FIG. 2. The longitudinal seam weld 2 at the fold of the half tubing crosses the transverse seam welds 3, 4 and ensures that the bags will have absolutely tightly sealed ends.

The welding or heat sealing apparatus comprises a symmetrical rocker 7, which has a pivot 8 that extends at right angles to the half tubing H and is mounted in a stationary position in the machine frame. As is apparent from FIG. 1, the rocker 7 is disposed within a loop of the half tubing. That loop is defined by the two stationary guide rollers 9, 9'. Due to the tension produced by the pair of feed rolls 1, the half tubing 1 extends over the upper surface of the rocker. To ensure that the half tubing will be transferred from the guide roller 9 to the rocker 7 and from the latter to the guide roller 9' exactly at the speed of the web, guide plates 10, 10' for guiding the half tubing are mounted at both ends of the rocker and extend along arcs of a circle having the same curvature as the circular orbit $k$ which is described by the ends of the rocker. Rotatable guide rollers 11, 11' for a smooth deflection of the half tubing are provided between the ends of the rocker and the guide plates 10, 10' and only slightly protrude from the surface of the rocker so that the advancing half tubing is lifted clear of the rocker. The seam welds 2, 3, 4 are produced by electrically heated welding bars 12, 13, 14, which are individually or jointly movable to and from the half tubing H in the direction of the arrow $d$ by means of holders, not shown, which are mounted on the rocker.

The rocker is driven by a slider linkage 15, 16, which comprises a rocker arm 16. The rocking motion of the latter is transmitted by a connecting linkage 17, 18, 19 to the rocker. The rocker arm 16 comprises a curved cam slot 20 for guiding the crank pin. That slot is shaped so that in view of the design of the connecting linkage 17–19 the peripheral velocity of the rocker on the circular orbit $k$ during the rocking motion of the rocker is equal for a predetermined time to the velocity of travel of the half tubing H. The time required for one revolution of the crank pin 15 is equal to the time in which the half tubing is advanced in the direction of travel $a$ one bag width $b$ or an even multiple of such bag widths by the pair of feed rolls 1. In the present embodiment, two transverse welding bars 13, 14 spaced by one bag width $b$ are provided. In accordance therewith, the period of the crank pin 15 is equal to the time in which the half tubing is advanced two bag widths ($2b$). The up and down motion of the welding bars 12, 13, 14 is so controlled that the bars rest on the half tubing during the time in which the peripheral velocity of the rocker is equal to the velocity of travel of the half tubing. For this reason, that time must be sufficient to ensure a proper welding at 2, 3, 4.

When the pair of feed rolls 1 advance the half tubing H at a uniform speed in the direction of travel $a$, the rocker 7 performs its rocking motion consisting of a counterclockwise swing from the initial position shown in FIG. 1 and a clockwise swing back to said initial position. During the counterclockwise swing of the rocker, the right-hand end thereof, which receives the arriving tubing, moves in the direction of travel $a$ of the half tubing. This will reduce the relative velocity between the rocker and the half tubing and that velocity will be equal to zero when the peripheral velocity of the rocker agrees with the velocity of travel of the half tubing.

The half tubing is then at rest relative to the rocker and remains in that condition of relative rest during the above-mentioned time in which the peripheral velocity of the rocker agrees with the velocity of travel of the half tubing. During the time for which the half tubing is in condition of rest, the welding bars 12, 13, 14 are applied to the half tubing, produce the seam welds 2, 3, 4, and are lifted from the half tubing. During the welding operation, the rocker serves as a backing for the half tubing to take up the pressure of the welding bars. As the rocker swings back in the clockwise sense, the left-hand or delivery end of the rocker moves opposite to the direction of travel $a$ of the half tubing so that the relative velocity between the rocker and the half tubing is increased. This increase will compensate the loss of time which has resulted during the welding operation.

When it is desired to adapt the flat bag-making machine to other bag widths, the velocity of travel of the half tubing H must be changed by a change of the speed of the pair of feed rolls 1 and the peripheral velocity of the rocker 7 must be adjusted to the new velocity of travel in that the point where the connecting rod 17 is linked to the rocker arm 16 is changed. Where a plurality of transverse welding bars 13, 14 are provided, the spacing $b$ of such bars in the direction of travel $a$ must be changed to the new bag width $b'$.

What is claimed is:

1. Apparatus for heat-sealing continuously moving web material, comprising a carrier adapted to support the web material with one surface thereof and a plurality of heat-sealing tools carried by said carrier, said heat-sealing tools being mounted to be reciprocable to and from said web material supporting surface, said carrier being pivotably mounted on an axis transverse to the direction of travel of the web material and extending through the transverse center plane of said carrier, two stationary guide rollers mounted upstream and downstream of said carrier, respectively, to define a loop of the web material therebetween having a plane stretch resting on said supporting surface, and drive means to impart to said carrier a rocking motion within the loop at a peripheral velocity which is temporarily equal to the velocity of travel of the web material.

2. Apparatus according to claim 1, wherein said carrier further comprises rotatable guide rollers mounted at the upstream and downstream ends, respectively, of said carrier such that their active peripheries adjacent said carrier ends are at least flush with said supporting surface.

3. Apparatus according to claim 2, wherein said carrier further comprises guide plates at both its ends for the web material, said guide plates having the shape of arcs of a circle having the same curvature as the circular orbit of the ends of said carrier and wherein said rotatable guide rollers are provided between the ends of said carrier and said guide plates.

4. Apparatus according to claim 2, wherein said rotatable guide rollers are arranged such that their active peripheries adjacent said carrier ends project over said supporting surface so as to keep the web material close to but clear of said supporting surface.

5. Apparatus according to claim 1, wherein the center of gravity of said carrier is disposed at least approximately on the pivotal axis thereof.

6. Apparatus according to claim 1, wherein said carrier further comprises guide plates at both its ends for the web material, said guide plates having the shape of arcs of a circle having the same curvature as the circular orbit of the ends of said carrier.

7. Apparatus according to claim 1, wherein said drive means comprises a rocker arm having a curved cam slot, a crank pin engaging said slot, and a connecting linkage adapted to transmit oscillation of said rocker arm to said carrier, said slot being so shaped that said connecting linkage imparts to the ends of said carrier a rocking motion which is temporarily synchronized with the velocity of travel of the web material.

* * * * *